(12) United States Patent
Wallace

(10) Patent No.: US 11,714,331 B2
(45) Date of Patent: Aug. 1, 2023

(54) CAMERA ASSEMBLY

(71) Applicant: Lenovo (Singapore) Pte. Ltd., Singapore (SG)

(72) Inventor: Brian William Wallace, Raleigh, NC (US)

(73) Assignee: Lenovo (Singapore) Pte. Ltd., Singapore (SG)

( * ) Notice: Subject to any disclaimer, the term of this patent is extended or adjusted under 35 U.S.C. 154(b) by 0 days.

(21) Appl. No.: 17/403,173

(22) Filed: Aug. 16, 2021

(65) Prior Publication Data

US 2023/0045803 A1 Feb. 16, 2023

(51) Int. Cl.
*G03B 15/02* (2021.01)
*H04N 23/63* (2023.01)
*G03B 9/08* (2021.01)
*G06F 1/16* (2006.01)

(52) U.S. Cl.
CPC ................. *G03B 9/08* (2013.01); *G03B 15/02* (2013.01); *H04N 23/633* (2023.01); *G06F 1/1605* (2013.01)

(58) Field of Classification Search
CPC .................................................... G03B 11/043
See application file for complete search history.

(56) References Cited

U.S. PATENT DOCUMENTS

| | | | | |
|---|---|---|---|---|
| 8,797,456 | B2* | 8/2014 | Liang | H04N 5/2251 248/439 |
| 8,989,612 | B2* | 3/2015 | Miyagawa | G03G 15/04036 399/81 |
| 10,334,145 | B2* | 6/2019 | Afrooze | H04N 5/772 |
| 10,455,670 | B2* | 10/2019 | Zeira et al. | H04L 12/4625 |
| 10,670,234 | B1* | 6/2020 | Oh et al. | G06F 1/1601 |
| 10,914,431 | B2* | 2/2021 | Kraz et al. | H04N 7/183 |
| 11,082,594 | B2* | 8/2021 | Imai et al. | G08B 21/18 |
| 11,297,284 | B2* | 4/2022 | Glazer et al. | G06V 20/52 |
| 2022/0256063 | A1* | 8/2022 | Chen | H04N 23/60 |

FOREIGN PATENT DOCUMENTS

CN 112925149 A * 6/2021 ............. G03B 15/03

OTHER PUBLICATIONS

"'On Air' Light for Microsoft Teams and Zoom Meetings", https://nothans.com/on-air-light-for-microsoft-teams-and-zoom-meetings, Archive.org copy dated Apr. 2020 (Year: 2020).*
("ON AIR WARNING!" press release dated May 5, 2021, https://www.einnews.com/pr_news/540146271/on-air-warning-unique-gadget-shows-when-the-camera-and-mic-are-on-launches-on-kick-starter-may-6-2021 (Year: 2021).*

* cited by examiner

*Primary Examiner* — Leon W Rhodes Jr
(74) *Attorney, Agent, or Firm* — Brian J. Pangrle

(57) ABSTRACT

A camera assembly can include a housing that includes a front side that includes a front side perimeter, a back side that includes a back side perimeter, and a surface that extends between the front side and the back side; a camera that includes a front side aperture; a front side illumination light; and a status light.

20 Claims, 12 Drawing Sheets

CAMERA ASSEMBLY

TECHNICAL FIELD

Subject matter disclosed herein generally relates to cameras for computing and display devices.

BACKGROUND

A system can include a display assembly with a display where, for purposes of person-to-person communications, the system can include a camera such as a web cam.

SUMMARY

A camera assembly can include a housing that includes a front side that includes a front side perimeter, a back side that includes a back side perimeter, and a surface that extends between the front side and the back side; a camera that includes a front side aperture; a front side illumination light; and a status light. Various other apparatuses, assemblies, systems, methods, etc., are also disclosed.

BRIEF DESCRIPTION OF THE DRAWINGS

Features and advantages of the described implementations can be more readily understood by reference to the following description taken in conjunction with examples of the accompanying drawings.

DETAILED DESCRIPTION

The following description includes the best mode presently contemplated for practicing the described implementations. This description is not to be taken in a limiting sense, but rather is made merely for the purpose of describing the general principles of the implementations. The scope of the invention should be ascertained with reference to the issued claims.

Figure 1:
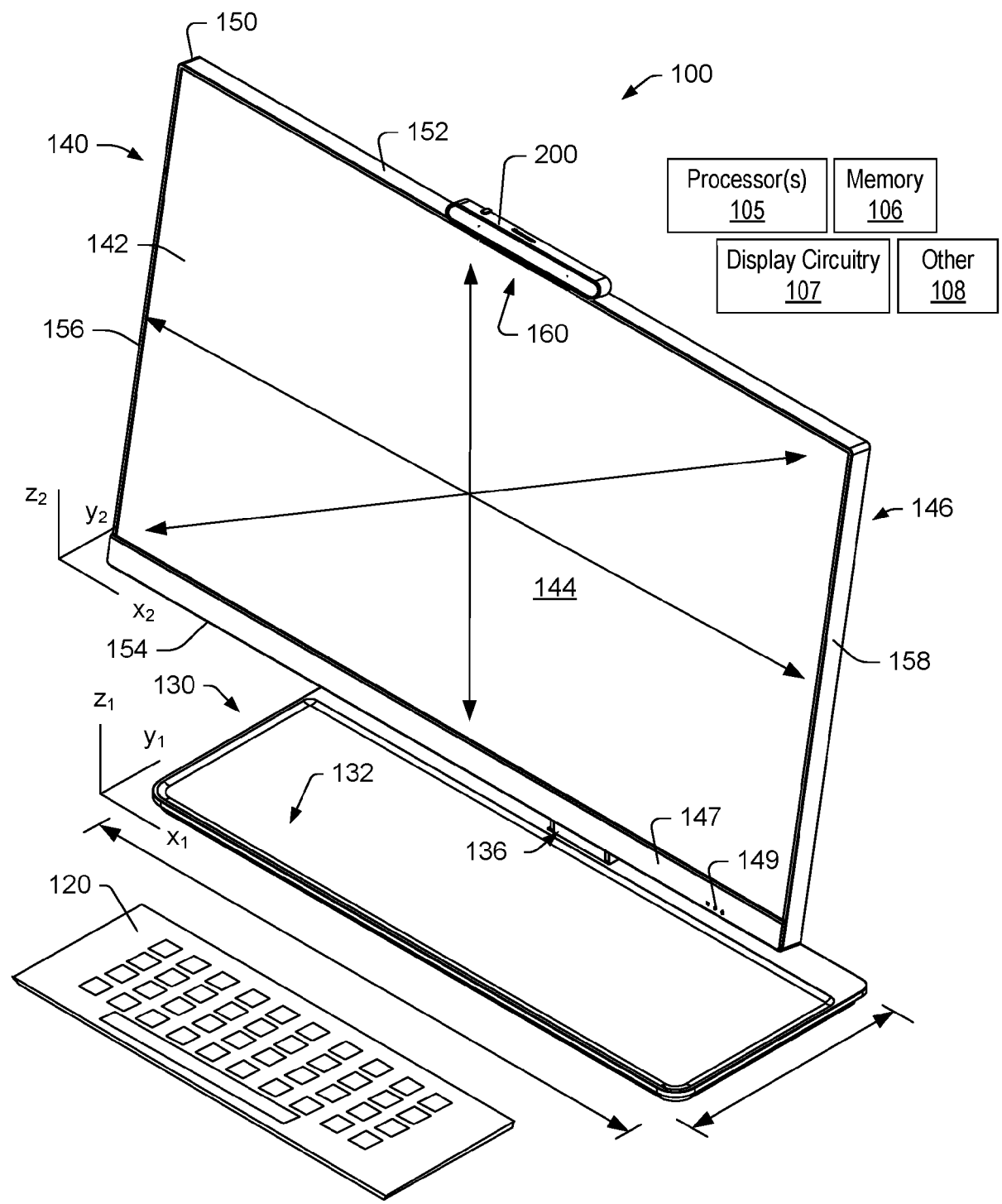
FIG. 1 is a perspective view of an example of a system.

FIG. 1 shows an example of a system 100 that can include one or more processors 105, memory 106 accessible to at least one of the one or more processors 105, display circuitry 107 and one or more other components 108, which can include electronic circuitry, instructions stored in the memory 106 and executable by at least one of the one or more processors 105, etc.

As shown in FIG. 1, the system 100 includes a display assembly 140 with a display 142 that may utilize one or more technologies (e.g., LED, LCD, etc.). The display assembly 140 can include a display side 144, a back side 146 and a frame 150 where the frame 150 can include an interface 160 for a camera assembly 200. The display circuitry 107 can be operatively coupled to at least one of the one or more processors 105, for example, to receive data, instructions, etc., for rendering text, graphics, images, etc., to the display side 144 of the display 142.

In the example of FIG. 1, the interface 160 can include frame magnetic material and a frame electronic interface for the camera assembly 200. For example, the camera assembly 200 can include magnetic material and an electronic interface that can couple to the frame 150 via the frame magnetic material and the frame electronic interface. For example, the camera magnetic material and the frame magnetic material can generate a magnetic attraction force that can provide for coupling of the frame electronic interface and the camera electronic interface. Such a magnetic attraction force may help to assure appropriate coupling for purposes of data and/or power transmission. As an example, one or more of the electronic interfaces may include resilient contacts where a magnetic attraction force can cause elastic deformation such that robust electrical connections are established for purposes of data and/or power transmission via the electronic interfaces.

As an example, a resilient contact may be a spring-loaded pin type of contact as a type of electrical connector. A resilient contact may be robust via resilience that helps to diminish effects of mechanical shock and vibration.

A particular type of resilient contact can be a pogo pin, which may include an integrated spring that can apply a force to a mating interface (e.g., receptacle, contact plate, etc.). Such a force may help to reduce risk of intermittent electrical connection (e.g., due to vibration, shock, etc.). As to types of springs that may be employed in a resilient contact, consider a helical spring, a cantilever spring, or other type of spring.

As an example, an electronic interface may include a target, which may be a conductive land. A target may be flat, curved, etc., and static (e.g., may be without moving parts). A target may be non-resilient such that elastic deformation does not occur, for example, when contacted. As an example, a target may be resilient and apply a biasing force against another resilient component (e.g., a pogo pin, etc.).

As an example, the display circuitry 107 can include one or more graphics processing units (GPUs) and, for example, one or more of the one or more processors 105 can be a central processing unit (CPU). As an example, the display circuitry 107 can include input circuitry such as touch circuitry, digitizer circuitry, etc., such that the display side 144 is an input surface. For example, the display side 144 may receive input via touch, a stylus, etc. As an example, the display assembly 140 can include a touchscreen display where a finger, a stylus, etc., can be utilized; noting sensing as to input may occur with or without physical contact between a finger and the display side 144, between a stylus and the display side 144, etc., depending on the type of input circuitry utilized (e.g., resistive, capacitive, acoustic wave, infrared, optical, dispersive signal, etc.).

In the example of FIG. 1, the system 100 can include a base 130 that includes an upper surface 132 and an arm 136 that is operatively coupled to the display assembly 140. For example, the arm 136 can extend from the base 130 where the display assembly 140 includes an arm mount that couples the arm 136 to the display assembly 140, for example, on the back side 142 of the display assembly 140 that is opposite the display side 144 of the display assembly 140. As an example, the base 130 and the arm 136 can be a stand for the display assembly 140.

As shown in the example of FIG. 1, the display side 144 may be centered along a centerline of the system 100 and may be disposed at an angle that can be defined by the base 130 or a flat support surface such as a desktop, a tabletop, a countertop, etc., where the base 130 or the flat support surface can be planar and horizontal. As shown, the arm 136 rises from the base 130 at an angle that may be normal to the base 130 or the flat support surface (e.g., a 90 degree angle). As to an angle of the display side 144, it may be 90 degrees, greater than 90 degrees or less than 90 degrees.

The display side 144 can be part of the display 142 that includes or is operatively coupled to the display circuitry 107, which may include one or more types of touch, digitizer, etc., circuitry. As shown, the base 130 and the display assembly 140 and/or the display side 144 can be defined with respect to one or more coordinate systems such as, for example, one or more Cartesian coordinate systems (see, e.g., $x_1$, $y_1$, $z_1$ and $x_2$, $y_2$, $z_2$). As shown, the display side 144 can be defined by a display area, which may be two-dimensional for a substantially flat (e.g., planar) display surface or which may be three-dimensional for a curved display surface, noting that such a curve may be of a relatively large radius of curvature (e.g., 50 cm or more) that gives the display a gentle curve (e.g., consider a radius of approximately the length of an extended arm of a user as traced by movement left and right from a shoulder of a user positioned in front of the display surface by an ergonomic distance). As shown, the arm 136 of the base 130 can be utilized to provide a gap or clearance between a lower edge of the display assembly 140 and a support surface on which the base 130 is supported (e.g., a desktop, tabletop, countertop, etc.). Such a gap may provide for rotation of the display 142 (e.g., from a landscape orientation to a portrait orientation).

In the example of FIG. 1, the frame 150 can include edges 152, 154, 156 and 158 where the edges 152 and 154 are long edges and where the edges 156 and 158 are short edges. For example, the frame 150 can be substantially rectangular (e.g., a rectangular form factor) and planar or curved. The frame 150 may include a landscape orientation as shown in FIG. 1 where the long edges 152 and 154 are substantially horizontal and a portrait orientation where the long edges 152 and 154 are rotated by approximately 90 degrees to be substantially vertical. The ability to transition from one orientation to the other may provide a user with options that can be ergonomic, content dependent, etc. In the example of FIG. 1, the system 100 can include features that provide for transitioning the frame 150 between portrait and landscape orientations.

As an example, the display assembly 140 may include a bezel or bezels that occupy a portion of the front side (e.g., the display side 144) or the display assembly 140 may be substantially bezel-less or completely bezel-less. In the example of FIG. 1, the display assembly 140 is substantially bezel-less where a lower bezel 147 may be included, optionally with one or more features 149 (e.g., switches, touch controls, indicator lights, etc.). A bezel-less display assembly can provide for a display surface dimensions that are approximately the same as frame dimensions. As an example, where a frame edge thickness is visible from a display side, the frame edge thickness may be less than approximately 0.5 cm in thickness and considered part of a substantially bezel-less approach. Where a display extends to an edge, where a frame edge thickness is not visible, such an approach can be considered part of a bezel-less approach. Bezel and bezel-less can be defined with respect to active display area as in some display assemblies, a bezel may be internal, being disposed beneath a cover glass.

Where a display assembly is bezel-less, space does not exist for a bezel integrated front facing camera. And where a display assembly includes a bezel along at least one edge, integration of a front facing camera into a bezel region takes space and may dictate the size of the bezel and hence a ratio of display assembly area to active display area. In some instances, a camera-less display assembly may be desirable. And, where a camera is not desired, it may be easier to manufacture a display assembly that is a bezel-less.

In the example of FIG. 1, the display assembly 140 and the camera assembly 200 may be part of a kit where a user can couple the camera assembly 200 to the display assembly 140 or not. In some instances, where de-coupling is too easy, the camera assembly 200 may be amenable to being readily de-coupled from a display assembly and carried away, for example, by a passer-by. As an example, a kit can include a balance of features that can provide for user options. For example, consider features that make de-coupling a little more complicated or inconvenient and other features that can include a mechanical shutter that can be positioned over an aperture of a camera (e.g., to block the camera's field of view (FOV)). In such an example, the camera assembly can be coupled to the display assembly and shuttered as desired or not coupled to the display, though with a risk of being misplaced, carried away, etc.

As an example, a kit may include a stand where a camera assembly can be coupled to a display assembly or to the stand. In such an example, the stand may or may not include a cable such as, for example, a USB cable such that the camera assembly can be electronically coupled to another device (e.g., a computing device, etc.) for purposes of data and/or power transmission.

In the example of FIG. 1, the camera assembly 200 is positioned on the frame 150, along the long edge 152. As an example, the display assembly 140 may include one or more interfaces, for example, consider an interface along one of the edges 152 and 154 and an interface along one of the edges 156 and 158. In such an approach, the display assembly 140 may be rotated to a desired orientation and the camera assembly 200 coupled thereto along a top edge of the display assembly 140.

A position of the camera assembly 200 can be defined, for example, using one or more of the coordinate systems shown in FIG. 1. For example, a height of the camera assembly 200 can be determined using coordinates of the coordinate system $x_2$, $y_2$, and $z_2$ with reference to coordinates of the coordinate system $x_1$, $y_1$, and $z_1$ or, for example, the height of the camera assembly 200 may be defined with respect to the coordinate system $x_1$, $y_1$, and $z_1$ alone (e.g., a height along $z_1$). Appropriate coordinates of either or both of the coordinate systems may be utilized for a landscape orientation or a portrait orientation of the display assembly 140.

As an example, the camera assembly 200 can include one or more cameras that may individually or collectively define a field of view (FOV). For optical elements, cameras, etc., the field of view (FOV) can be defined by a solid angle through which electromagnetic radiation can be received. In photography, the field of view is that part of the world that is visible through a camera at a particular position and orientation in space; objects outside a FOV when an image is captured are not recorded in the image. In photography, FOV may be expressed as an angular size of a view cone, as an angle of view. For a normal lens, the diagonal field of view can be calculated FOV = 2 arctan(SensorSize/2f), where f is focal length.

An angle of view can differ from an angle of coverage, which describes the angle range that a lens can image. An image circle produced by a lens or optical element assembly can be configured to be large enough to cover a photosensor, for example, with no or minimal vignetting toward edges. If the angle of coverage of the lens does not fill the photosensor, the image circle will be visible, with strong vignetting toward the edges, and the effective angle of view can be limited to the angle of coverage.

In the example of FIG. 1, the camera assembly 200 is positioned to provide a forward FOV such that a user of the system 100 can be imaged, for example, for purposes of videoconferencing. The camera assembly 200 can include an adjustable mount where, for example, a user positioned in front of the system 100 may be brought into the FOV of the camera assembly 200 via the adjustable mount. As an example, an adjustable mount may provide for rotation of the camera assembly 200, for example, to allow for a backward facing FOV. As an example, the camera assembly 200 may include multiple cameras, which may include one or more front facing cameras and one or more back facing cameras. In the example of FIG. 1, the camera assembly can include features that provide for tilting, for example, tilting down or tilting up, which may provide for adjustments where the display side 144 is tilted down or tilted up. As an example, the camera assembly 200 may be tiltable and rotatable.

Figure 2:
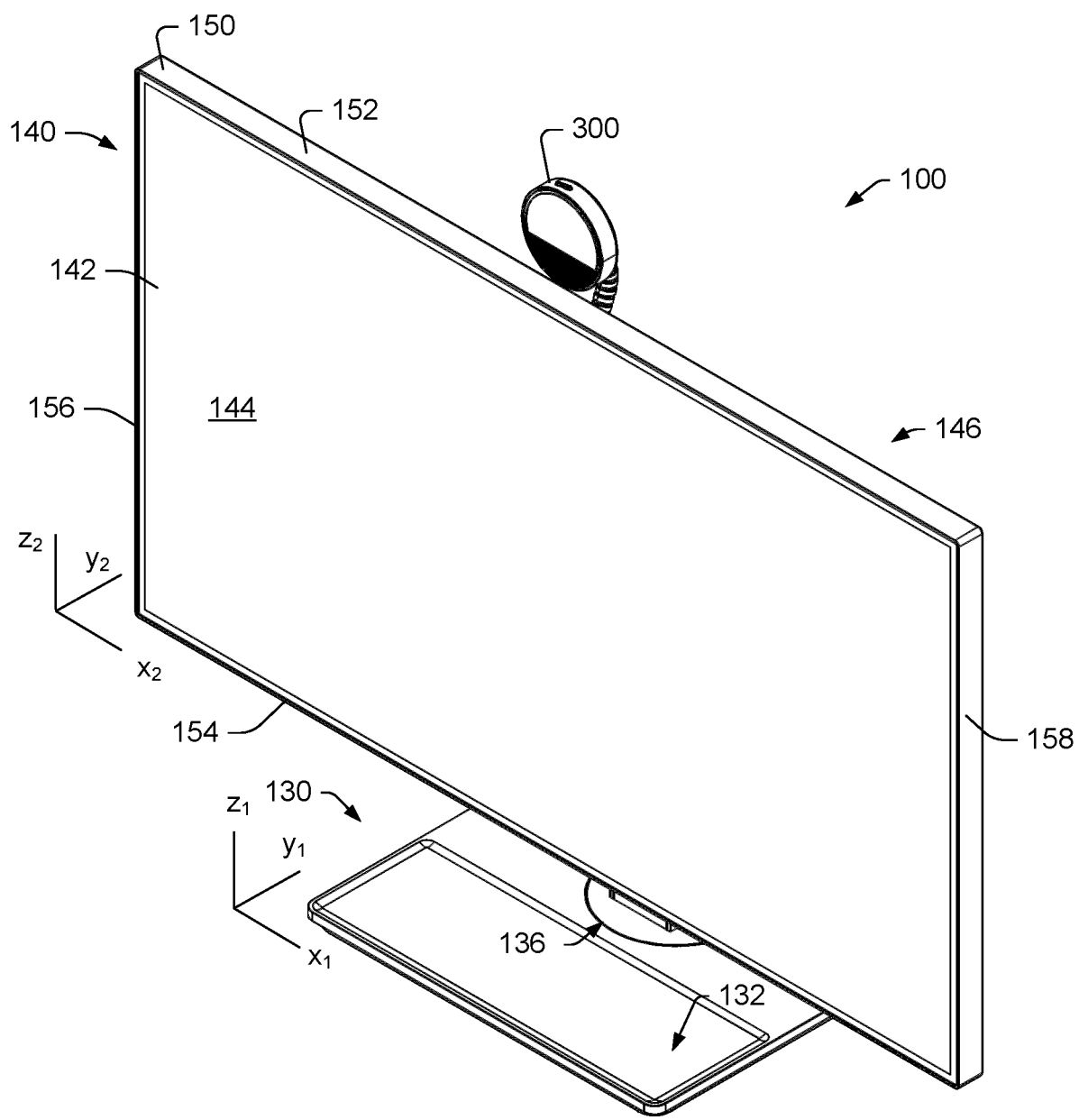
FIG. 2 is a perspective view of an example of a system.

FIG. 2 shows a perspective view of an example of the system 100 with an example of a camera assembly 300 where the shape of the camera assembly 300 can be rounder (e.g., more circular) than the shape of the camera assembly 200.

As an example, a camera assembly can include a housing that includes a front side that includes a front side perimeter, a back side that includes a back side perimeter, and a surface that extends between the front side and the back side, a camera that includes a front side aperture; a front side illumination light; and a status light.

Figure 3:
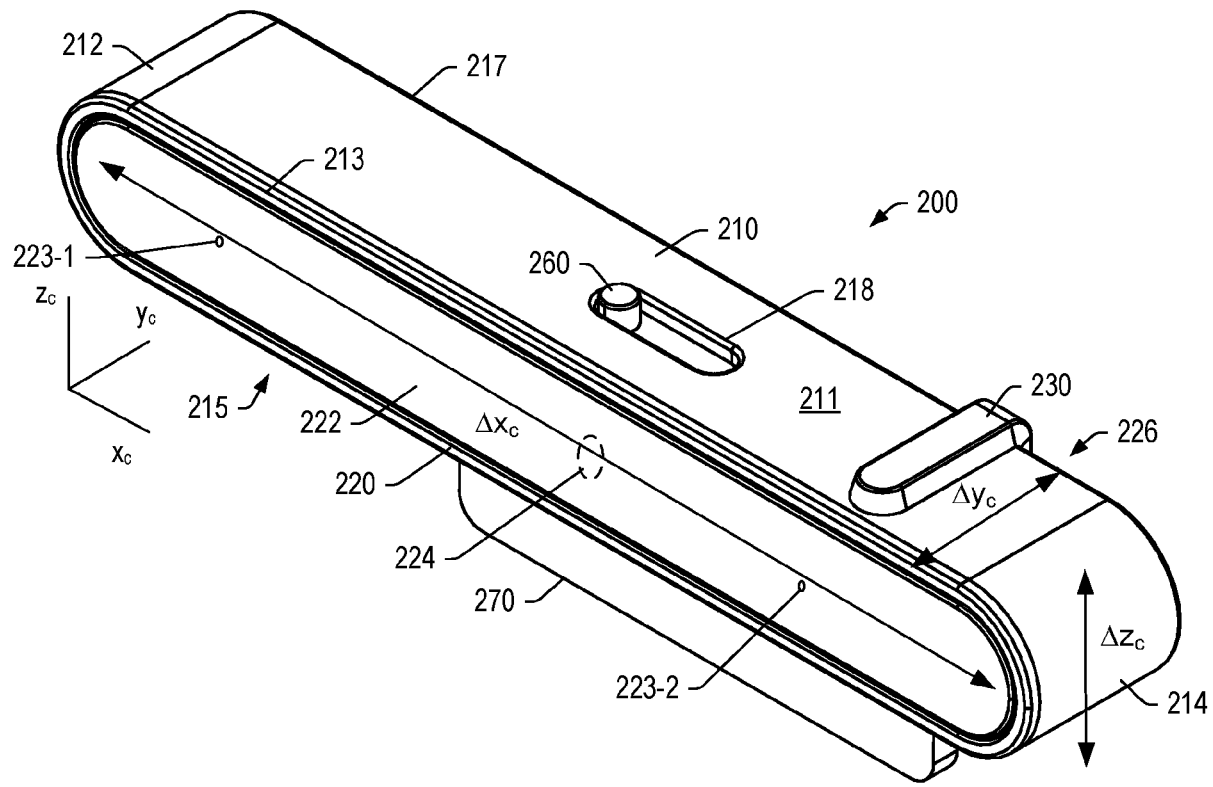
FIG. 3 is a perspective view of an example of a camera assembly.

FIG. 3 shows a perspective view of an example of the camera assembly 200 as including a housing 210, a front side 222 with a front side perimeter 213, a back side 226 with a back side perimeter 217, a surface that extends between the front side 222 and the back side 226 (e.g., consider the surface as being defined by the perimeter 213 and the perimeter 217), a camera that includes a front side aperture, a front side illumination light 220 and a status light 230.

As shown in the example of FIG. 3, the surface of the housing 210 can include a top side 211, opposing side 212 and 214 and a bottom side 215. As an example, the camera assembly 200 can include a mechanical shutter 260 that can be movable to a closed positon or an open position, or optionally one or more other positions. The mechanical shutter 260 may be operatively coupled to circuitry, for example, for purposes of circuit control, etc. As an example, the mechanical shutter 260 may indirectly control circuitry, for example, by blocking light from a camera (e.g., covering an aperture, etc.) where the blocking of light may be sensed by the camera as a type of control signal. Also shown is a Cartesian coordinate system $x_c$, $y_c$ and $z_c$ that may be utilized to define one or more features of the camera assembly 200, which is shown as including a base 270 (e.g., a mount). One or more features of the camera assembly 200 may be defined with respect to a coordinate system or coordinate systems (e.g. Cartesian, polar, cylindrical, etc.).

In the example of FIG. 3, the housing 210 may be defined via an aspect ratio, for example, using the $x_c$ coordinate axis and the $z_c$ coordinate axis. As shown, the aspect ratio may be greater than approximately 2:1 (e.g., length $\Delta x_c$ along $x_c$ is at least twice the height $\Delta z_c$ along $z_c$). As an example, for a circular housing, an aspect ratio may be 1:1. A greater aspect ratio may provide for positioning an aperture of a camera of the camera assembly 200 closer to an edge of an active display area of a display assembly (e.g., consider a relatively slim camera assembly that may have a housing height $\Delta z_c$ less than approximately 3 cm and a housing length $\Delta x_c$ less than approximately 20 cm). As shown in FIG. 3, the housing 210 can include a depth $\Delta y_c$, along $y_c$. As an example, the depth $\Delta y_c$, of the housing 210 may be less than approximately 10 cm and may be less than approximately 6 cm.

As shown in FIG. 3, the front side 222 can include one or more openings 223-1 and 223-2 and/or one or more transparent portions 224. For example, the one or more openings 223-1 and 223-2 may be for receipt of sound waves where the camera assembly 200 includes one or more microphones and the one or more transparent portions 224 may be for a camera or cameras and, for example, to be able to see an indicator (e.g., a marker) when the shutter 260 is in a closed position via movement in a direction of a slot 218 in the top side housing portion 211. As an example, the front side 222 can include a glass material, a polymeric material, etc., that may include darkened portions (e.g., blacked out, etc.) and one or more transparent portions. As shown in the example of FIG. 3, the transparent portion 224 is disposed between the openings 223-1 and 223-2 where the openings 223-1 and 223-2 may be for left and right microphones (e.g., consider stereo audio capture, etc.).

Figure 4A:
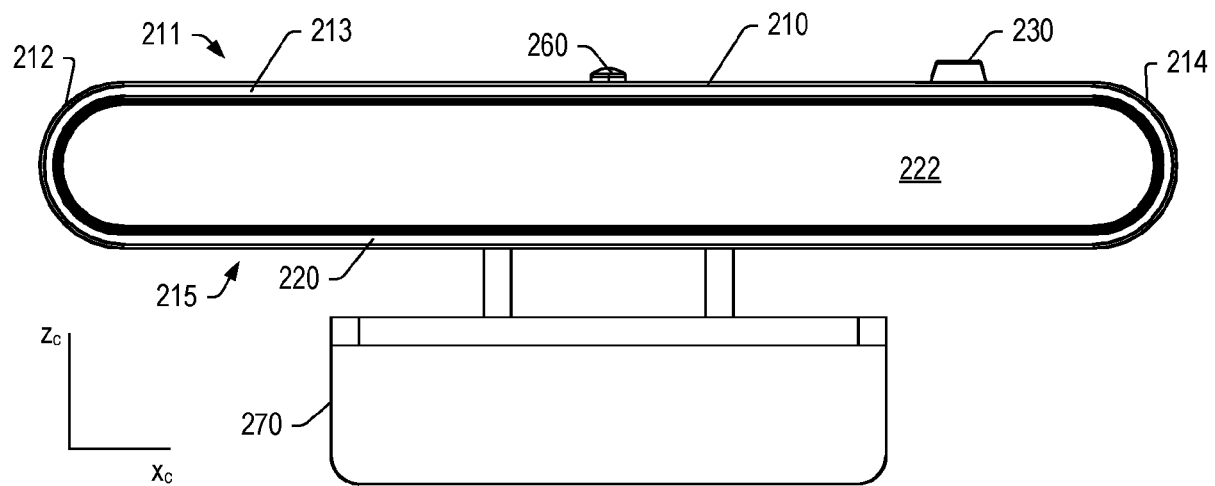
FIG. 4A and FIG. 4B are front and back views of the camera assembly of FIG. 3, respectively.
Figure 4B:
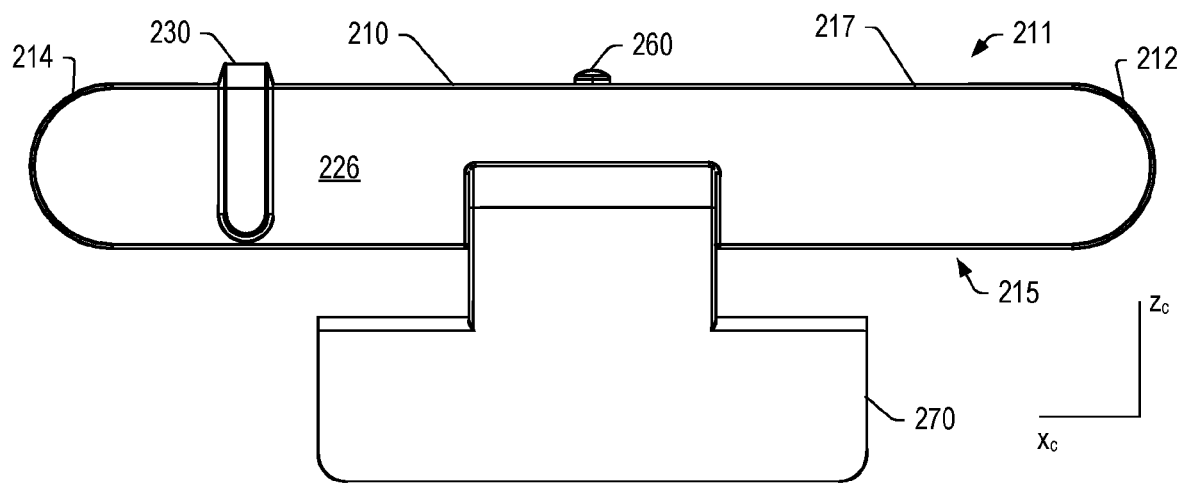

FIG. 4A and FIG. 4B show front and back views of the camera assembly 200, respectively. As shown in FIG. 4B, the status light 230 can extend outwardly from the top side 211 and can extend outwardly from the back side 226. In such an example, a passer-by may be able to see the status light 230 as an indicator that a user is in a videoconference meeting, etc. As shown, the status light 230 may be set back a distance from the front side perimeter 213 (see, e.g., FIG. 3) such that it does not distract a user that may be in a networked conference session (e.g., via video/audio or via audio). As shown, the distance by which the status light 230 extends outwardly from the top side 211 may be minimal (e.g., consider less than 10 mm or less than 5 mm). One or more of shape, positioning and dimensions may aim to reduce distraction to a user by a status light while providing a sufficiently wide field-of-view for passers-by, which may be standing, walking, etc., and thereby having a view from a higher elevation than a user (e.g., consider a seated user in a standard sized desk chair).

Figure 5:
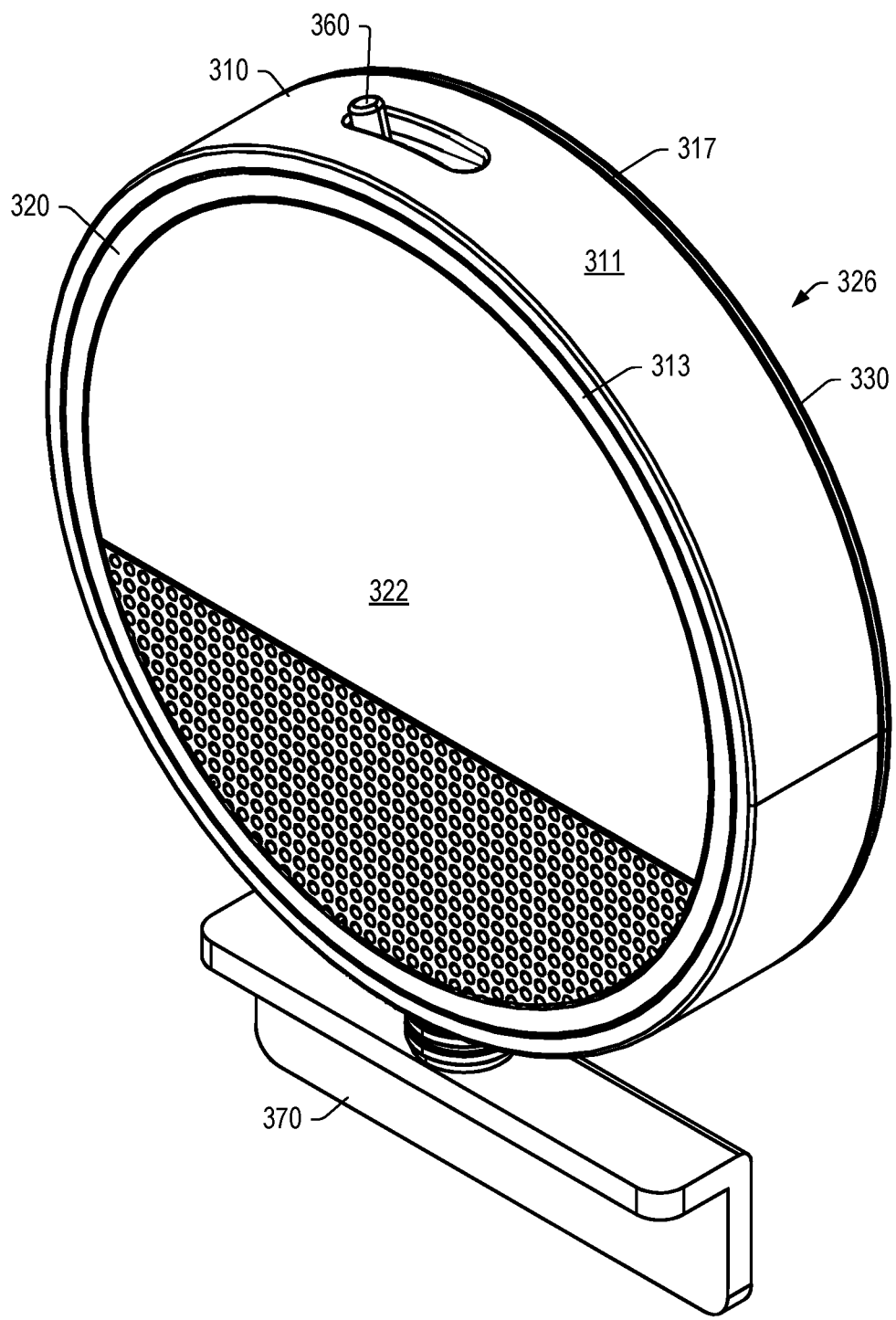
FIG. 5 is a perspective view of an example of a camera assembly.

FIG. 5 shows a perspective view of an example of the camera assembly 300 as including a housing 310, a front side 322 with a front side perimeter 313, a back side 326 with a back side perimeter 317, a surface 311 that extends between the front side 322 and the back side 326 (e.g., consider the surface 311 as being defined by the perimeter 313 and the perimeter 317), a camera that includes a front side aperture, a front side illumination light 320 and a status light 330.

As an example, the camera assembly 300 may be defined using a cylindrical coordinate system with a central axis, a radial coordinate and an azimuthal coordinate. In the example of FIG. 5, the housing 310 may be defined using a radius, a diameter, etc., and a thickness along the central axis. As to an azimuthal coordinate, consider 0 degrees as being at the top, where the camera assembly 360 is shown as including a mechanical shutter 260. The camera assembly 300 may include a perforated portion with openings, for example, to facilitate sound wave transmission to one or more microphones of the camera assembly 300.

In the example of FIG. 5, the status light 330 is positioned along the back side perimeter 317 or slight inset therefrom. In such an example, a user may not be able to directly see the status light 330 when positioned in front of the camera assembly 330. Where the status light 330 includes an edge visible at along the back side perimeter 317, a user may be able to see a portion of the status light 330, which may be a muted portion depending on the finish, arrangement, etc., of components that make up the status light 330.

Figure 6A:
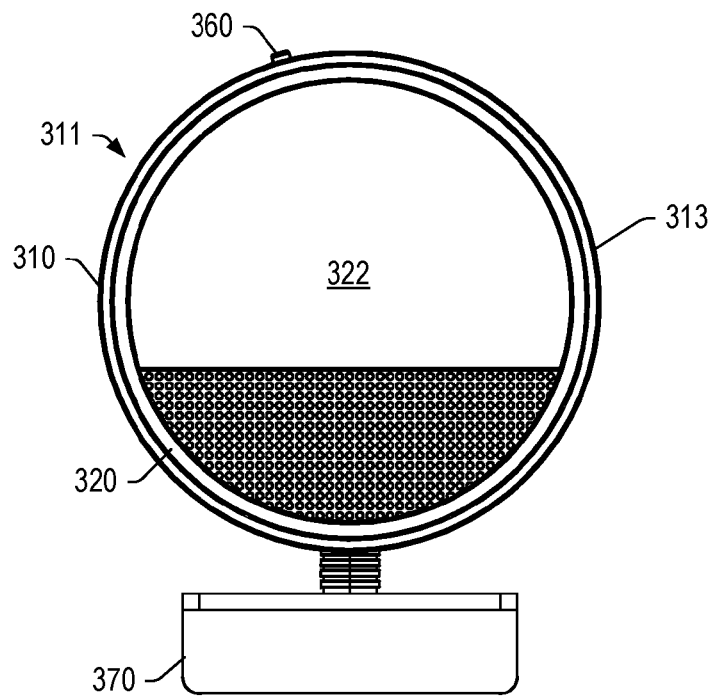
FIG. 6A and FIG. 6B are front and back views of the camera assembly of FIG. 3, respectively.
Figure 6B:
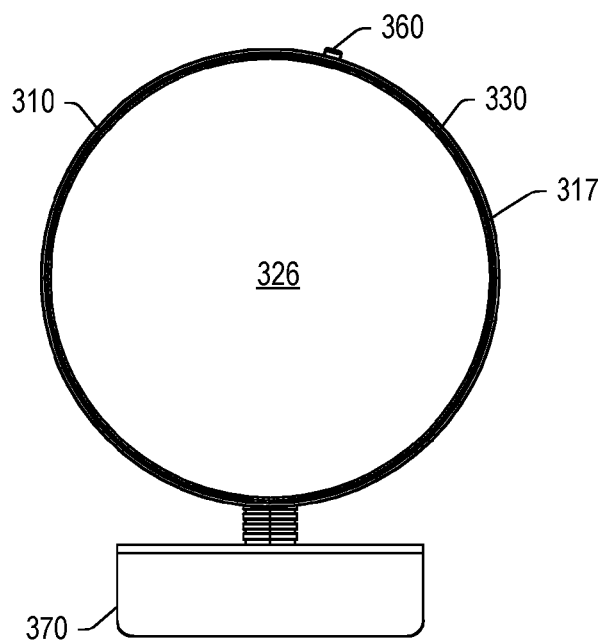

FIG. 6A and FIG. 6B show front and back views of the camera assembly 300, respectively. As shown in FIG. 6A, the front side illumination light 320 may be slightly inset from the perimeter 313 (e.g., radially inset) and, as shown in FIG. 6B, the status light 330 may be slightly inset from the perimeter 317 (e.g., radially inset). As an example, the front side illumination light 320 and the status light 330 as a back side status light may be symmetrical. For example, they may be of approximately the same radius and may span a common portion of their respective sides (e.g., 360 degrees, etc.). As explained, the illumination light 320 and the status light 330 can be controllable, for example, via one or more signals, which may be received via an interface such as a cable interface (e.g., a USB cable, etc.) and/or a display assembly interface (e.g., as may be positioned on a display assembly frame such as the interface 160 of the example of FIG. 1).

As an example, a front side illumination light may run along at least a portion of a front side perimeter or along portions of a front side perimeter. As an example, a front side illumination light may be continuous, for example, forming a ring or other closed curve. As an example, a housing of a camera assembly may be shaped as a stadium, an oval, etc. A stadium can include straight, parallel sides and opposing curved sides. In such an example, a front side illumination light may include portions one or more of along the straight, parallel sides and/or one or more of the opposing curved sides.

Figure 7A:
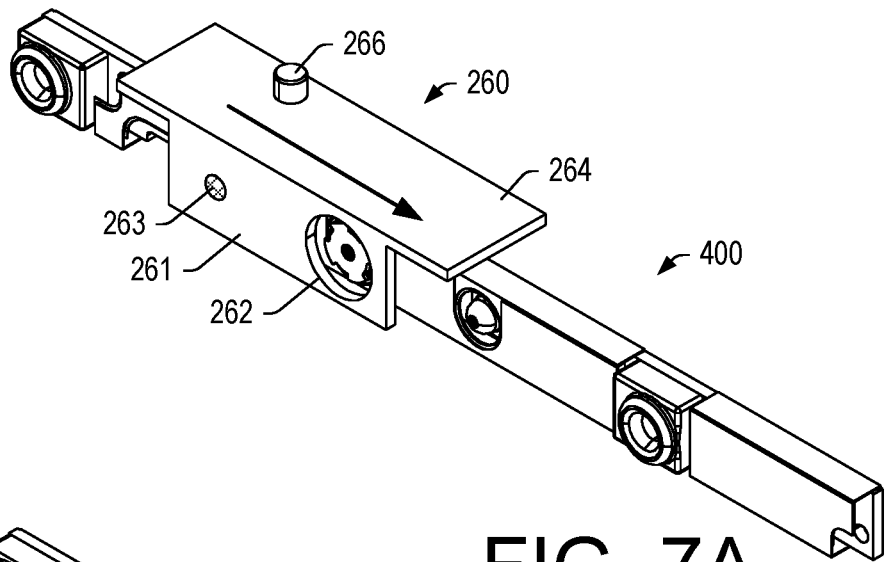
FIG. 7A, FIG. 7B and FIG. 7C are perspective views of an example of circuitry.
Figure 7B:
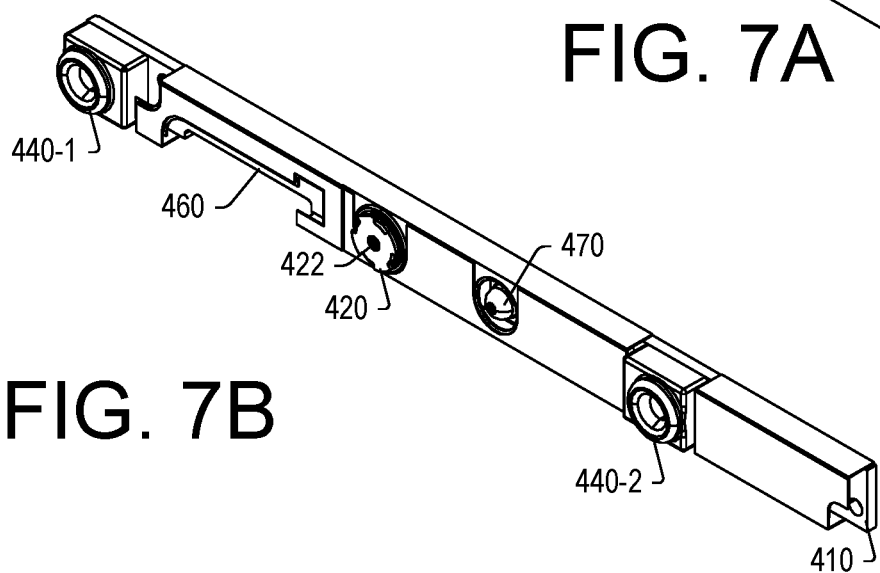
Figure 7C:
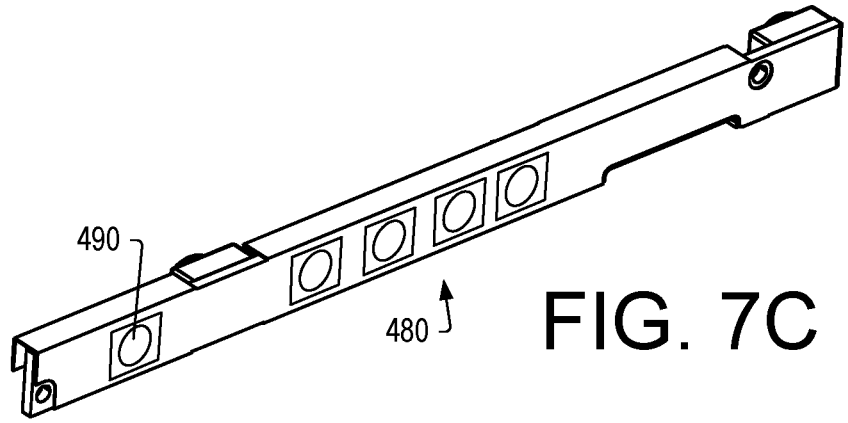

FIG. 7A, FIG. 7B and FIG. 7C show perspective views of an example of media capture circuitry 400. In FIG. 7A, the media capture circuitry 400 is shown along with an example of the mechanical shutter 260, which can include a front side shutter panel 261 with an opening 262 and a marker 263 and which can include a top side panel 264 with an extension 266 that can be accessible to a user for translating the mechanical shutter 260 from an open position as shown to a closed position where the opening 262 is moved away from an aperture 422 of the camera 420 and where a marker 263 (e.g., a colored marker such as a red marker) becomes visible to indicate to a user that the mechanical shutter 260 is in the closed position.

As shown in FIG. 7B, the media capture circuitry 400 can include one or more microphones 440-1 and 440-2 (e.g., a microphone array, etc.) and can include one or more other sensors 470 such as, for example, an infrared sensor (e.g., an infrared camera).

As shown in FIG. 7C, the media capture circuitry 400 may optionally include or may optionally be fitted with one or more light emitting diodes (LEDs) 480 and 490. For example, consider one or more surface mount LEDs, which may be addressable. As an example, an LED may be controllable as to intensity, color, on/of, etc. As an example, the LEDs 480 may be for front side illumination and the LED (e.g., or LEDs) 490 may be for a status light.

LEDs are known to be less than 100 percent efficient. As such, a camera assembly may include one or more thermal management features that can act to dissipate heat generated by operation of one or more LEDs. For example, consider utilization of a metallic heat sink, optionally with fins. As an example, a camera assembly may include one or more vents that can provide for airflow, for example, via natural convection. As mentioned, a camera assembly may include openings for purposes of receiving sound waves by a microphone or microphones. In such an example, the openings may also provide for airflow that promotes heat transfer (e.g., cooling).

Figure 8:
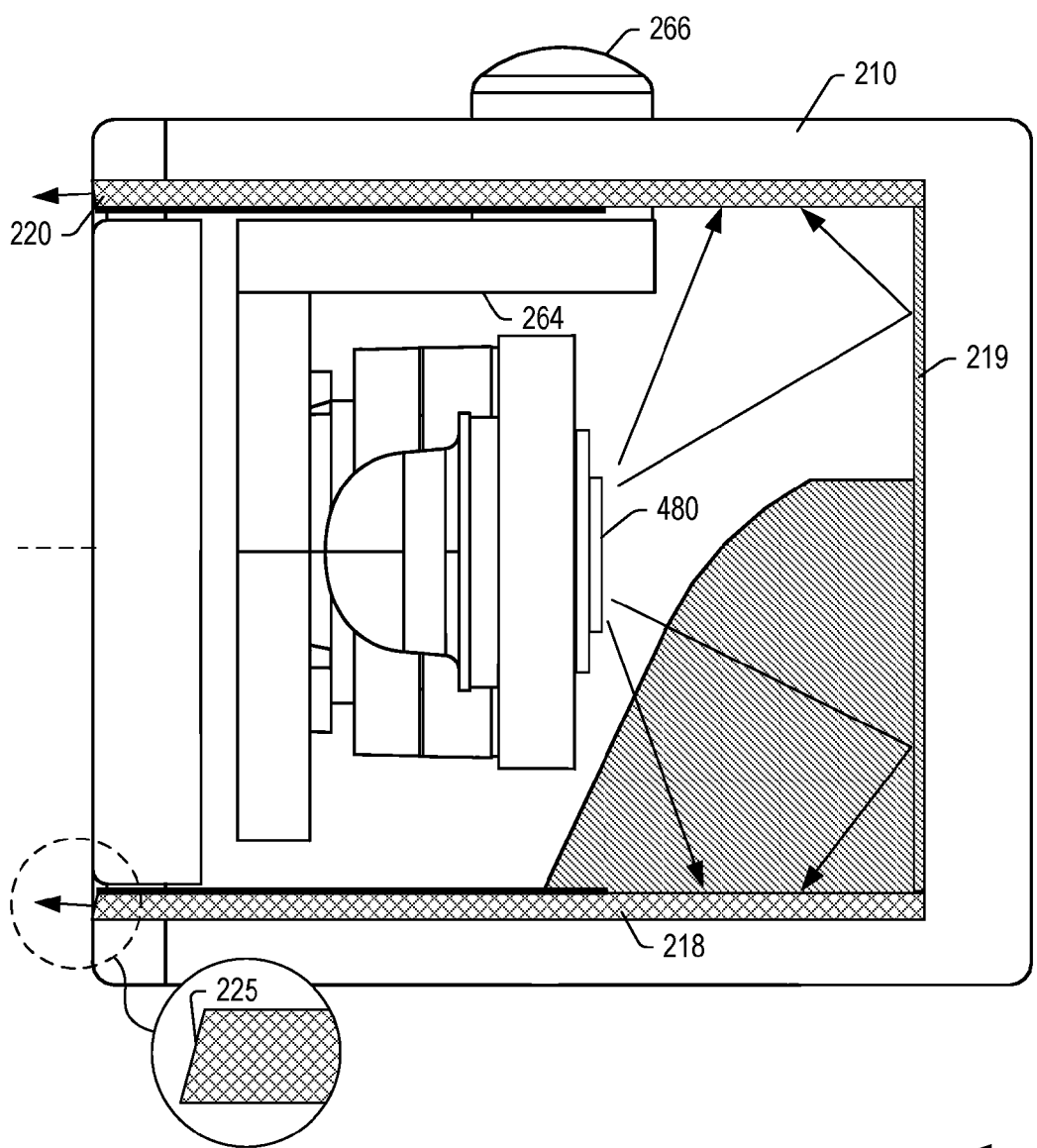
FIG. 8 is a cross-sectional, cut-away view of an example of a camera assembly and a block diagram of an example of a method.
Figure 8:
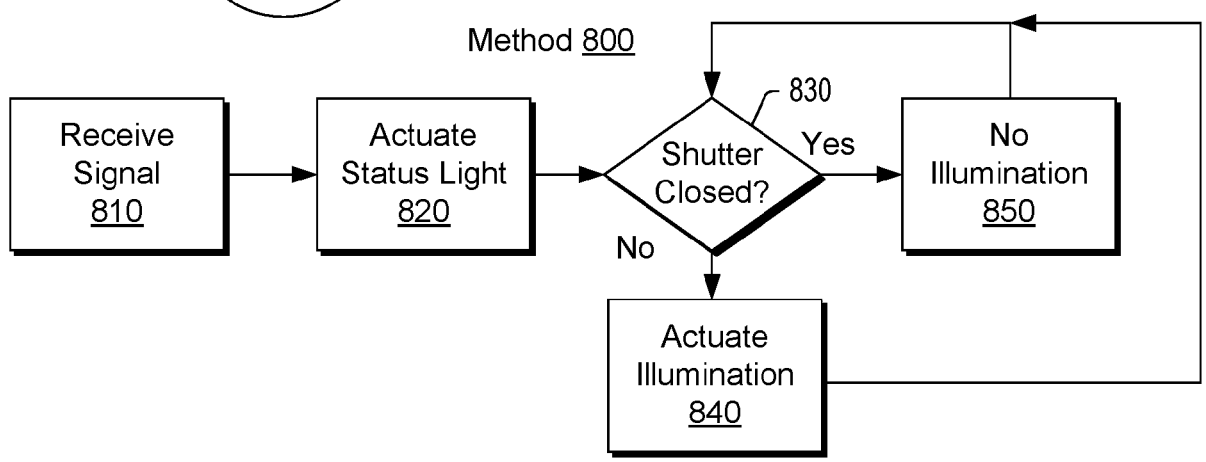

FIG. 8 shows a cross-sectional, cut-away view of an example of the camera assembly 200 along with an example of a method 800. As shown, the method 800 can include various types of logic. For example, the method 800 can include a reception block 810 for receiving a signal (e.g., from a videoconferencing application, etc.), an actuation block 820 for actuating a status light responsive to the signal, a decision block 830 for deciding whether a shutter is closed where, for a "no" decision, the method 800 includes an actuation block 840 for actuating a front side illumination light and, for a "yes" decision, the method 800 includes a block 850 for not actuating the front side illumination light or de-actuating the front side illumination light where the shutter transitions from an open position to a closed position. In a closed position, circuitry of a camera assembly may remain powered. For example, consider utilization of one or more microphones such that a user joins a videoconferencing session via audio but not video.

In the cross-sectional, cut-away view of FIG. 8, the front side illumination light 220 can include one or more light guides 218, which may include non-covered portions and covered portions. As an example, one or more interior surfaces of the camera assembly 200 may be reflective, for example, consider a highly reflective, mirror like finish 219. In such an example, light emitted by the LED 480 may be reflected and directed toward a light guide where the light guide can "guide" the light outwardly, for example, at an end 255 of the front side illumination light 220 as indicated by arrows. As shown via thick black lines, one or more of the one or more light guides 218 may be covered, which may block light from exiting and which may increase internal reflection. Such an approach to blocking light may help to diminish extraneous light from a camera sensor or camera sensors.

A polymeric material such as polymethylmethacrylate (PMMA or acrylic), polycarbonate (PC), etc., can be utilized for guiding light. As an example, one or more ceramic material can be utilized for guiding light (e.g., glass, etc.). As an example, a material may provide for guiding light from a surface to an edge or vice versa or from an edge to an edge.

In the example of FIG. 8, the one or more light guides 218 may be surface to edge light guides where light hitting a surface can be transmitted to an edge (see, e.g., the front edge 225). As an example, one or more features may be provided for edge based transmission (e.g., from edge to edge). As an example, one or more fiber optics may be utilized, for example, to provide end to end transmission along a length of an optical fiber. As an example, an LED may be oriented in an end on manner where the LED is adjacent to an end (e.g., an edge) or a light guide. In such an example, transmission of light from the LED toward a user may be from end to end (e.g., edge to edge) of a light guide.

Figure 9:
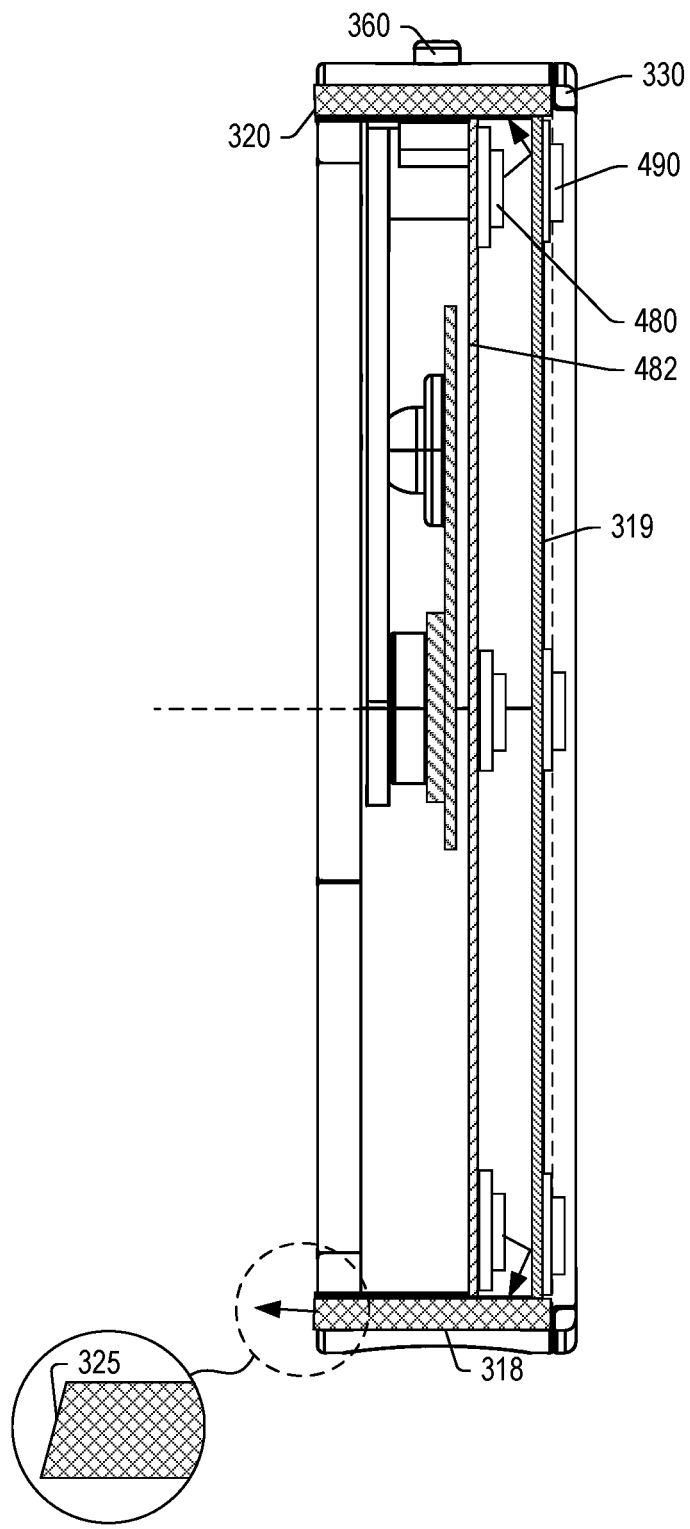
FIG. 9 is a cross-sectional, cut-away view of an example of a camera assembly.

FIG. 9 shows a cross-sectional, cut-away view of an example of the camera assembly 300. As shown, the one or more LEDs 480 can be mounted to a board 482, which may be a circuit board that can include one or more heat sinks. In the example of FIG. 9, the one or more LEDs 490 may be embedded or otherwise separated from light emissions of the one or more LEDs 480. For example, consider relatively low power LEDs that can be white with a red lens or red such that the status light 330 can be illuminated (e.g., as a ring along the back side 326 of the camera assembly 300). As shown, the one or more LEDs 480 may utilize one or more light guides 318 and, for example, a reflective material 319 may be utilized to increase the percent of emitted light that reaches the one or more light guides 318. As explained with respect to FIG. 8, one or more ends 325 may be finished, cut, etc., for purposes of directing illumination forward.

As an example, a front side illumination light may direct illumination in a cone like manner. For example, rather than having the illumination diffuse randomly from a surface of a diffuse material, the illumination may be directed toward a region such as an expected facial region of a user that is seated in front of a display. In such an example, the generated illumination may provide for optimal use such that less energy is wasted illuminating regions that do not include a user's face. In such an approach, the power may be reduced, which can reduce thermal management demands.

A human head can generally be fit in a square of 30 cm by 30 cm or consider a circle of a diameter of 30 cm. Various commercial "beauty lights" can be operable by plugging into a standard 120 V/220 V wall outlet. Such beauty lights can be relatively large in size, for example, consider a 30 cm diameter. Heat generated from such beauty lights does not generally present issues. However, such beauty lights are practically suited for mounting to a display assembly or for being powered via a display assembly or computer connector such as, for example, a USB connector. A camera assembly that includes a light with a diffuse cover may be sub-optimal as from a distance of 15 cm, the light may already be covering an area over 30 cm², and when moved to a general display-to-user distance of approximately 50 cm or more, the light can increase coverage to an area of 100 cm² with a much lesser energy density such that much of the light is wasted.

As an example, irradiance, a radiometric quantity, can be utilized for characterizing a front side illumination light where irradiance is measured in watts per square meter (W/m²). Irradiance can also be referred to as intensity.

A point source of light produces spherical wavefronts. Irradiance of a point source tends to vary inversely with the square of the distance from the source:

$$E=P/A=P/\left(4\pi r^2\right)$$

where r is the distance; P is the radiant power; and A is the surface area of a sphere of radius r.

For quick approximations, the foregoing equation indicates that doubling the distance reduces irradiation to one quarter; or similarly, to double irradiation, reduce the distance to 0.7. When a source is not exactly a point source, an irradiance profile may be obtained by the image convolution of a picture of the light source.

Figure 10:
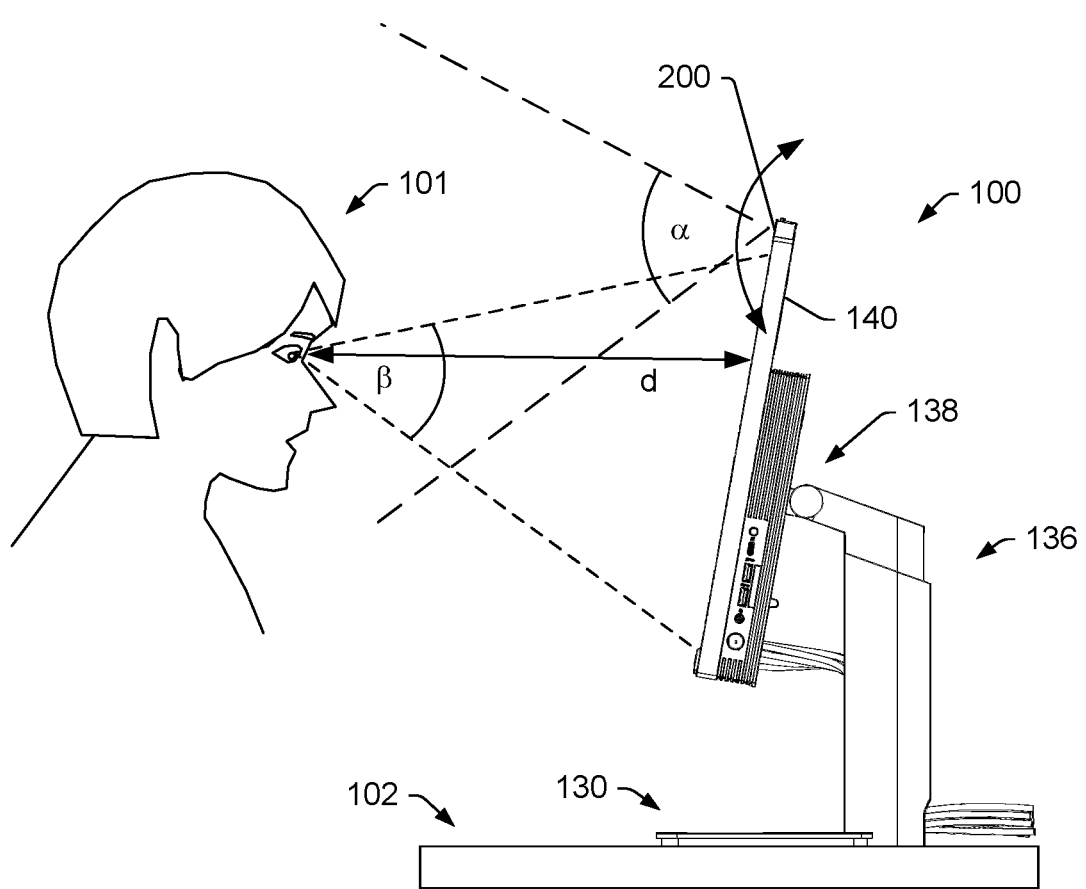
FIG. 10 is a series of diagrams of an example of a user and the system of FIG. 1 and an example of a captured image.
Figure 10:
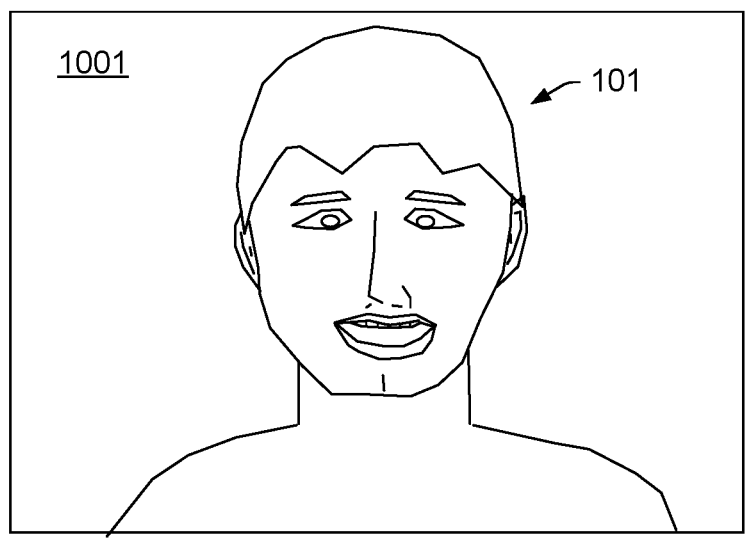

FIG. 10 shows an example of a user 101 positioned in front of the system 100 as supported on a surface 102 where the display assembly 140 is operatively coupled to the arm 136 of the base 130 via an arm mount 138 (e.g., an arm coupling, etc.). In such an example, the angle of a display surface of the display assembly 140 may be adjusted.

In the example of FIG. 10, the camera assembly 200 is shown as having an angle α with an origin at the camera assembly 200 and the user 101 is shown as having an angle β with an origin or origins at the user's eye or eyes, where a distance d is indicated as a distance from the display noting that, depending on tilt, size of display, etc., the distance to the camera assembly 200 can be greater.

As shown, the camera assembly 200 can capture an image 1001 of the user 101. In the example of FIG. 10, the image may be less than 50 cm by 50 cm, again, noting that a human head can generally fit within a 30 cm by 30 cm box.

As explained, a camera assembly such as the camera assembly 200 or the camera assembly 300 can provide for illumination of a user's face when the user is seated in front of a system such as the system 100 as in FIG. 1 and FIG. 2.

As explained, various trade-offs can exist when illuminating a user's face. For example, a light source should not be too bright that it blinds the user or otherwise distracts the user from seeing what is rendered to a display; a light source should not be so energy intensive that it generates an inordinate amount of heat energy (e.g., due to inefficiency of a light source) and/or that it cannot be powered by an available serial bus port (e.g., a USB bus port, etc.); and a light source should not be wasteful in terms of illuminating an overly broad area. Additionally, a light source should not be overly complex to an extent that it complicates manufacturing, increases size and mass and drives costs significantly upward.

As explained, an image such as the image 1001 may be transmitted via one or more networks to a remote device where the image 1001 can be rendered to a display of the remote device or operatively coupled to the remote device. For example, one or more network interfaces of the system 100 can be operatively coupled to one or more networks to transmit image data of the image 1001 (e.g., to a network address, etc.).

As mentioned, a system can include a camera assembly with a camera such as a web cam that can be utilized for communications. For example, consider a videoconferencing application (e.g., the ZOOM application, the SKYPE application, the GO TO MEETING application, the WEBEX application, etc.) where circuitry of a camera assembly can transmit image data for images captured within the field of view of the camera. For improved facial appearance in videoconferencing, a front side illumination light of a camera assembly can be utilized, which may help to reduce facial shadows, improve seeing facial expressions, allow for easier lip reading, etc.

As an example, an optimal viewing angle for eyes may be defined according to the International Standards Organization (ISO ergonomics standards 9241-5). ISO 9241-5 states that an optimal viewing angle, or resting angle, is a -35 degree downward gaze angle from the horizon (e.g., at the level of the eyes). ISO 9241-5 also states that the optimal display placement is in a range of +/- 15 degrees from the resting angle (e.g., -20 degrees to -50 degrees). Using the ISO 9241-5, a display surface may be optimally placed to be in a range of -20 degrees to -50 degrees relative to the horizon. The ISO 9241-5 range tends to be a bit lower than most users are accustomed for computer work, but is near a "normal" reading position as used by humans for many years. In this "normal" reading position, a display surface may be more appropriately called chest-height rather than head-height. As to specific upper and lower limits of ISO 9241-5, it allows for a 0 degree horizontal gaze down to a -60 degrees gaze angle; noting that the lower limit of -60 degree angle may result in some amount of neck strain.

Various standards as to viewing angles can be limited to display surfaces of a certain size. For example, as display area increases, for example, beyond an approximately 50 cm diagonal dimension, an optimal position can have the top of the display area at a level that is above eye level. For example, a display surface of the display assembly 140 of FIG. 10 can have a diagonal dimension that is greater than 50 cm (e.g., consider approximately 70 cm or more) such that an optimal viewing angle may differ from that specified by a standard.

In the example of FIG. 10, the user may adjust the camera assembly 200, for example, via tilting, to provide for a suitable capture of the user's face. As mentioned, the system 100 may provide for rotation of the display assembly 140 where, for example, the arm mount 138 includes a turntable. In such an example, the camera assembly 200 may be utilized from a substantially vertical edge in a portrait orientation of the display assembly 140 and from a substantially horizontal edge in a landscape orientation.

Figure 11:
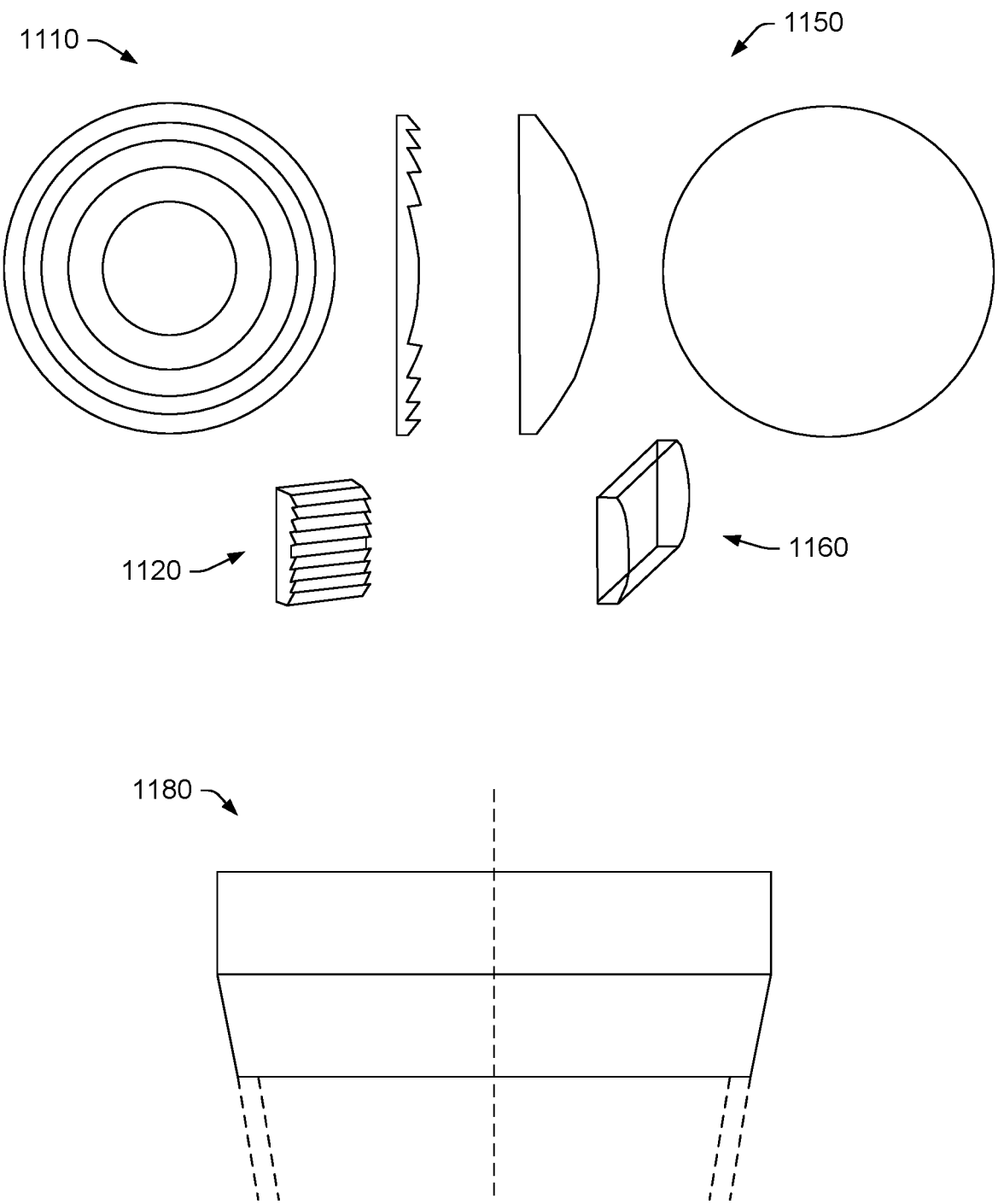
FIG. 11 is a series of diagrams of examples of optical elements.

FIG. 11 shows various examples of optical elements 1110, 1120, 1150, 1160 and 1180. As shown, the optical elements 1110 and 1120 are Fresnel lenses which may be adaptations of plano-convex lenses 1150 and 1160. As an example, a Fresnel lens may act to conserve space and, for example, allow for implementation of a larger range of optical parameters when compared to a plano-convex lens. For example, the volume of the Fresnel lens optical element 1110 is less than the volume of the plano-convex lens optical element 1150. In FIG. 11, the optical elements 1120 and 1160 are substantially rectangular while the optical elements 1110 and 1150 are substantially round.

As an example, an optical element may be a collimator that acts to collimate light. For example, the optical elements 1110 and 1120 can collimate light when light is received via the flat side. For example, point source light received via the flat side can be collimated to emanate substantially parallel via the Fresnel features side. As an example, an annular or closed curve optical element may be composed of features such as the optical element 1120 (e.g., as arranged in an annular manner where the optical element 1120 may be a portion of annulus or closed curve, which may include one or more straight portions).

In FIG. 11, the optical element 1180 can provide for directing light. For example, the optical element 1180 may include one or more features that act to direct light such as a ring of light from an area defined by a first dimension to an area defined by a second, smaller dimension. In such an example, the light may diffuse to enlarge an area; however, the features can help to reduce that area. For example, the optical element 1180 can help to focus more of light emitted by a front side illumination light toward a user's face. As explained, such an approach can help to conserve energy, reduce heat management demands, etc.

As an example, an optical element can include a bundle of optical fibers that terminates in a curved pattern (e.g., a circle, an oval, a stadium, etc.), which may be canted slightly inward towards an axis. Such an approach can help to provide more on-axis directional illumination (e.g., to reduce dispersion of light energy toward regions that do not contribute to facial illumination, etc.).

As an example, a camera assembly can include a housing that includes a front side that includes a front side perimeter, a back side that includes a back side perimeter, and a surface that extends between the front side and the back side, a camera that includes a front side aperture; a front side illumination light; and a status light.

As an example, a camera assembly can include a mechanical shutter, positionable to cover a front side aperture. In such an example, the camera assembly can include a switch that controls actuation and de-actuation of the front side illumination light. For example, consider actuation and de-actuation of the front side illumination light via the switch in a manner that depends on position of the mechanical shutter. As an example, a position of a mechanical shutter can control a switch indirectly by camera-based light sensing via a front side aperture.

As an example, a camera assembly can include a mechanical shutter that can be positioned to cover a front side aperture of a camera, where the position of the mechanical shutter can control a front side illumination light, which can, for example, be de-actuated via the mechanical shutter without de-actuation of a status light.

As an example, a status light of a camera assembly can extend outwardly from a surface of a housing of the camera assembly. In such an example, the status light can include a top side, a housing surface side, and a 360 degree surface disposed between the top side and the surface side. As an example, a status light may extend outwardly from a back side of a housing of a camera assembly.

As an example, a camera assembly can include a status light that runs along at least a portion of a back side perimeter of a housing. For example, consider a status light runs along at least 50 percent of the back side perimeter of the housing. As an example, a status light can form at least a portion of a back side perimeter where, for example, the status light may be visible from a side of the housing (e.g., a side of a cylindrically shaped housing). As an example, a camera assembly may have a puck shape where one side includes an illumination light for illuminating a user's face and where an opposing side includes a status light for indicating to others that the user may be in a videoconference session.

As an example, a camera assembly can include a front side illumination light that runs along at least a portion of a front side perimeter of a housing. For example, consider a front side illumination light that runs along at least 50 percent of the front side perimeter of the housing.

As an example, a camera assembly can include a status light that runs along at least a portion of a back side perimeter of a housing and a front side illumination light that runs along at least a portion of a front side perimeter of the housing.

As an example, a camera assembly can include a front side illumination light includes at least one light guide and at least one light emitting diode. In such an example, the at least one light guide can focus light emitted by the at least one light emitting diode. As an example, a light guide can include one or more polymeric optical elements (e.g., consider PMMA, PC, etc.).

As an example, a camera assembly can include a front side perimeter that is circular. As an example, a camera assembly can include a front side perimeter is obround (e.g., a stadium).

As an example, a camera assembly can include control circuitry that controls operation of a front side illumination light and a status light. In such an example, actuation of the front side illumination light can depend on actuation of the status light.

As an example, a camera assembly can include detection circuitry. For example, consider a rangefinder sensor, an IR sensor, or type of human presence detector, etc. In such an example, a front side illumination light can be operatively coupled to the object detection circuitry for actuation responsive to object detection (e.g., to switch off if a user is not present in front of the camera assembly).

As an example, a camera assembly can include a microphone or microphones (e.g., consider a microphone array, etc.).

The term "circuit" or "circuitry" is used in the summary, description, and/or claims. As is well known in the art, the term "circuitry" includes all levels of available integration, e.g., from discrete logic circuits to the highest level of circuit integration such as VLSI, and includes programmable logic components programmed to perform the functions of an embodiment as well as general-purpose or special-purpose processors programmed with instructions to perform those functions. Such circuitry may optionally rely on one or more computer-readable media that includes computer-executable instructions. As described herein, a computer-readable medium may be a storage device (e.g., a memory card, a storage disk, etc.) and referred to as a computer-readable storage medium.

Figure 12:
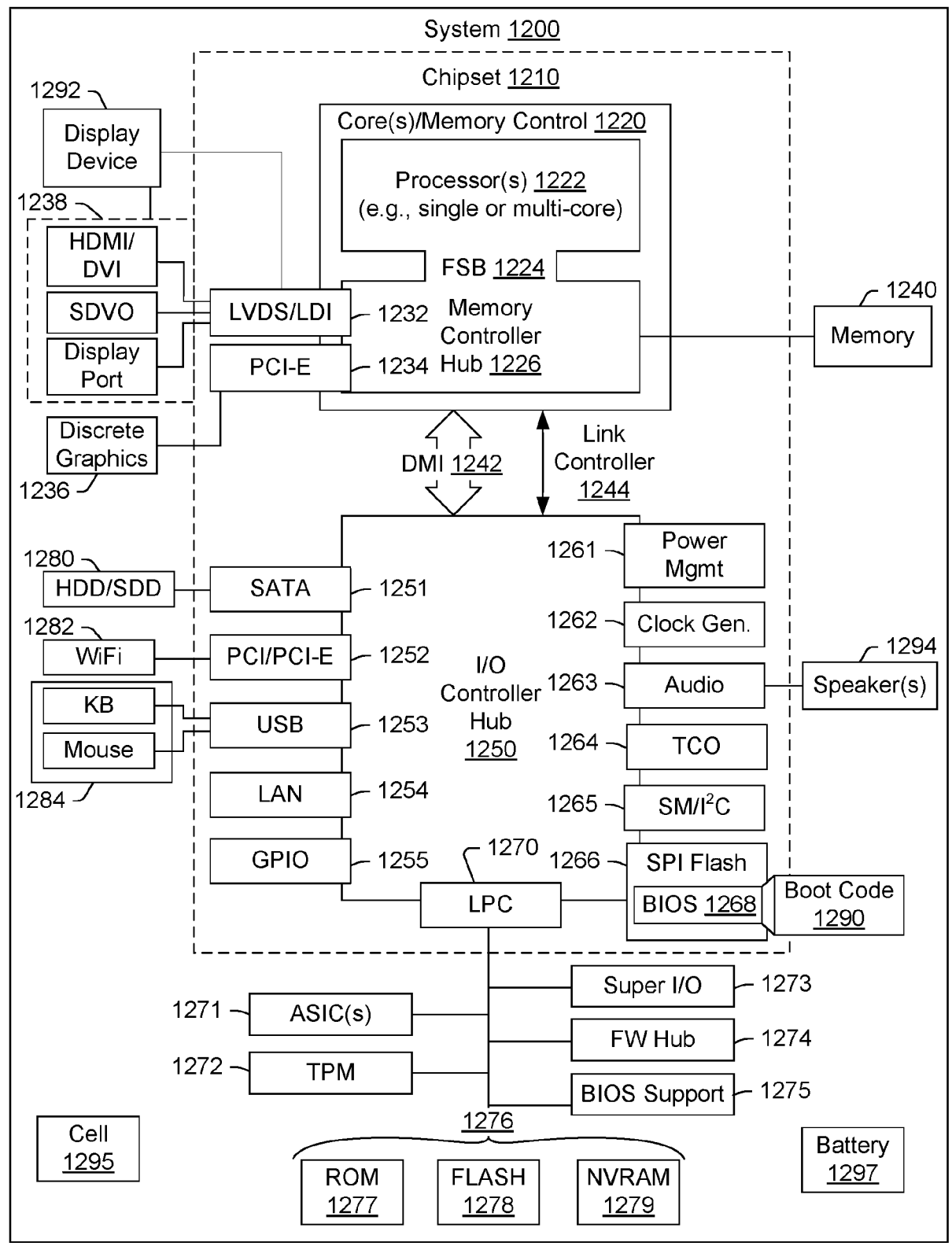
FIG. 12 is a diagram of an example of a system.

While various examples of circuits or circuitry have been discussed, FIG. 12 depicts a block diagram of an illustrative computer system 1200. The system 1200 may be a computer system sold by Lenovo (US) Inc. of Morrisville, NC (e.g., a THINKSTATION® system, etc.); however, as apparent from the description herein, a satellite, a base, a display, a computing device, a server or other machine may include one or more features and/or other features of the system 1200.

As an example, a monitor or display may include features such as one or more of the features included in one of the LENOVO® IDEACENTRE® or THINKCENTRE® "all-in-one" (AIO) computing devices (e.g., sold by Lenovo (US) Inc. of Morrisville, NC). For example, the LENOVO® IDEACENTRE® A720 computing device includes an Intel® Core i7 processor, a 27 inch frameless multi-touch display (e.g., for HD resolution of 1920 x 1080), a NVIDIA® GeForce® GT 630 M 2 GB graphics card, 8 GB DDR3 memory, a hard drive, a DVD reader/writer, integrated Bluetooth® and 802.11 b/g/n Wi-Fi®, USB connectors, a 6-in-1 card reader, a webcam, HDMI in/out, speakers, and a TV tuner.

As shown in FIG. 12, the system 1200 includes a so-called chipset 1210. A chipset refers to a group of integrated circuits, or chips, that are designed to work together. Chipsets are usually marketed as a single product (e.g., consider chipsets marketed under the brands INTEL®, AMD®, etc.).

In the example of FIG. 12, the chipset 1210 has a particular architecture, which may vary to some extent depending on brand or manufacturer. The architecture of the chipset 1210 includes a core and memory control group 1220 and an I/O controller hub 1250 that exchange information (e.g., data, signals, commands, etc.) via, for example, a direct management interface or direct media interface (DMI) 1242 or a link controller 1244. In the example of FIG. 12, the DMI 1242 is a chip-to-chip interface (sometimes referred to as being a link between a "northbridge" and a "southbridge").

The core and memory control group 1220 include one or more processors 1222 (e.g., single core or multi-core) and a memory controller hub 1226 that exchange information via a front side bus (FSB) 1224. As described herein, various components of the core and memory control group 1220 may be integrated onto a single processor die, for example, to make a chip that supplants the conventional "northbridge" style architecture.

The memory controller hub 1226 interfaces with memory 1240. For example, the memory controller hub 1226 may provide support for DDR SDRAM memory (e.g., DDR, DDR2, DDR3, etc.). In general, the memory 1240 is a type of random-access memory (RAM). It is often referred to as "system memory".

The memory controller hub 1226 further includes a low-voltage differential signaling interface (LVDS) 1232. The LVDS 1232 may be a so-called LVDS Display Interface (LDI) for support of a display device 1292 (e.g., a CRT, a flat panel, a projector, etc.). A block 1238 includes some examples of technologies that may be supported via the LVDS interface 1232 (e.g., serial digital video, HDMI/DVI, display port). The memory controller hub 1226 also includes one or more PCI-express interfaces (PCI-E) 1234, for example, for support of discrete graphics 1236. Discrete graphics using a PCI-E interface has become an alternative approach to an accelerated graphics port (AGP). For example, the memory controller hub 1226 may include a 16-lane (x16) PCI-E port for an external PCI-E-based graphics card. A system may include AGP or PCI-E for support of graphics. As described herein, a display may be a sensor display (e.g., configured for receipt of input using a stylus, a finger, etc.). As described herein, a sensor display may rely on resistive sensing, optical sensing, or other type of sensing.

The I/O hub controller 1250 includes a variety of interfaces. The example of FIG. 12 includes a SATA interface 1251, one or more PCI-E interfaces 1252 (optionally one or more legacy PCI interfaces), one or more USB interfaces 1253, a LAN interface 1254 (more generally a network interface), a general purpose I/O interface (GPIO) 1255, a low-pin count (LPC) interface 1270, a power management interface 1261, a clock generator interface 1262, an audio interface 1263 (e.g., for speakers 1294), a total cost of operation (TCO) interface 1264, a system management bus interface (e.g., a multi-master serial computer bus interface) 1265, and a serial peripheral flash memory/controller interface (SPI Flash) 1266, which, in the example of FIG. 12, includes BIOS 1268 and boot code 1290. With respect to network connections, the I/O hub controller 1250 may include integrated gigabit Ethernet controller lines multiplexed with a PCI-E interface port. Other network features may operate independent of a PCI-E interface.

The interfaces of the I/O hub controller 1250 provide for communication with various devices, networks, etc. For example, the SATA interface 1251 provides for reading, writing or reading and writing information on one or more drives 1280 such as HDDs, SDDs or a combination thereof. The I/O hub controller 1250 may also include an advanced host controller interface (AHCI) to support one or more drives 1280. The PCI-E interface 1252 allows for wireless connections 1282 to devices, networks, etc. The USB interface 1253 provides for input devices 1284 such as keyboards (KB), one or more optical sensors, mice and various other devices (e.g., microphones, cameras, phones, storage, media players, etc.). On or more other types of sensors may optionally rely on the USB interface 1253 or another interface (e.g., I$^2$C, etc.). As to microphones, the system 1200 of FIG. 12 may include hardware (e.g., audio card) appropriately configured for receipt of sound (e.g., user voice, ambient sound, etc.).

In the example of FIG. 12, the LPC interface 1270 provides for use of one or more ASICs 1271, a trusted platform module (TPM) 1272, a super I/O 1273, a firmware hub 1274, BIOS support 1275 as well as various types of memory 1276 such as ROM 1277, Flash 1278, and non-volatile RAM (NVRAM) 1279. With respect to the TPM 1272, this module may be in the form of a chip that can be used to authenticate software and hardware devices. For example, a TPM may be capable of performing platform authentication and may be used to verify that a system seeking access is the expected system.

The system 1200, upon power on, may be configured to execute boot code 1290 for the BIOS 1268, as stored within the SPI Flash 1266, and thereafter processes data under the control of one or more operating systems and application software (e.g., stored in system memory 1240). An operating system may be stored in any of a variety of locations and accessed, for example, according to instructions of the BIOS 1268. Again, as described herein, a satellite, a base, a server or other machine may include fewer or more features than shown in the system 1200 of FIG. 12. Further, the system 1200 of FIG. 12 is shown as optionally include cell phone circuitry 1295, which may include GSM, CDMA, etc., types of circuitry configured for coordinated operation with one or more of the other features of the system 1200. As shown, the system 1200 may include one or more batteries 1297 and, for example, battery management circuitry.

Although examples of methods, devices, systems, etc., have been described in language specific to structural features and/or methodological acts, it is to be understood that the subject matter defined in the appended claims is not necessarily limited to the specific features or acts described. Rather, the specific features and acts are disclosed as examples of forms of implementing the claimed methods, devices, systems, etc.

What is claimed is:

1. A camera assembly comprising:
   a housing that comprises a front side that comprises a front side perimeter, a back side that comprises a back side perimeter, and a surface that extends between the front side and the back side;
   a camera that comprises a front side aperture;
   a front side illumination light;
   a networked conference session status light; and
   a mechanical shutter, positionable to cover the front side aperture, wherein the mechanical shutter is positioned to cover the front side aperture, the front side illumination light is de-actuated without de-actuation of the networked conference session status light.

2. The camera assembly of claim 1, comprising a switch that controls actuation and de-actuation of the front side illumination light.

3. The camera assembly of claim 2, wherein actuation and de-actuation of the front side illumination light via the switch depends on position of the mechanical shutter.

4. The camera assembly of claim 2, wherein position of the mechanical shutter controls the switch indirectly by camera-based light sensing via the front side aperture.

5. The camera assembly of claim 1, wherein the networked conference session status light extends outwardly from the surface of the housing.

6. The camera assembly of claim 5, wherein the networked conference session status light comprises a top side, a housing surface side, and a 360 degree surface disposed between the top side and the surface side.

7. The camera assembly of claim 5, wherein the networked conference session status light extends outwardly from the back side of the housing.

8. The camera assembly of claim 1, wherein the networked conference session status light runs along at least a portion of the back side perimeter of the housing.

9. The camera assembly of claim 8, wherein the networked conference session status light runs along at least 50 percent of the back side perimeter of the housing.

10. The camera assembly of claim 1, wherein the front side illumination light runs along at least a portion of the front side perimeter of the housing.

11. The camera assembly of claim 10, wherein the front side illumination light runs along at least 50 percent of the front side perimeter of the housing.

12. The camera assembly of claim 1, wherein the networked conference session status light runs along at least a portion of the back side perimeter of the housing and wherein the front side illumination light runs along at least a portion of the front side perimeter of the housing.

13. The camera assembly of claim 1, wherein the front side illumination light comprises at least one light guide and at least one light emitting diode.

14. The camera assembly of claim 13, wherein the at least one light guide focuses light emitted by the at least one light emitting diode.

15. The camera assembly of claim 13, wherein the at least one light guide is a polymeric optical element.

16. The camera assembly of claim 1, wherein the front side perimeter is circular.

17. The camera assembly of claim 1, wherein the front side perimeter is obround.

18. The camera assembly of claim 1, comprising control circuitry that controls operation of the front side illumination light and the networked conference session status light.

19. A camera assembly comprising:
    a housing that comprises a front side that comprises a front side perimeter, a back side that comprises a back side perimeter, and a surface that extends between the front side and the back side;
    a camera that comprises a front side aperture;
    a front side illumination light; and
    a networked conference session status light, wherein the networked conference session status light runs along at least a portion of the back side perimeter of the housing.

20. The camera assembly of claim 19, wherein the networked conference session status light extends outwardly from the surface of the housing along a portion of a top side of the housing.

* * * * *